No. 867,600. PATENTED OCT. 8, 1907.
A. D. RAY.
VEHICLE TIRE.
APPLICATION FILED NOV. 7, 1906.

Albert D. Ray,
Inventor

Witnesses
M. A. Schmidt
Geo. E. Tew

By Milo B. Stevens & Co.
Attorneys

UNITED STATES PATENT OFFICE.

ALBERT D. RAY, OF CLEVELAND, OHIO.

VEHICLE-TIRE.

No. 867,600.　　　　Specification of Letters Patent.　　　Patented Oct. 8, 1907.

Application filed November 7, 1906. Serial No. 342,362.

*To all whom it may concern:*

Be it known that I, ALBERT D. RAY, a citizen of the United States, residing at Cleveland, in the county of Cuyahoga and State of Ohio, have invented new and useful Improvements in Vehicle-Tires, of which the following is a specification.

This invention relates to that class of resilient tires known as clencher tires, having an outside casing of rubber, canvas, or both, such as is commonly used with a pneumatic inner tube, the outer casing having shoulders which engage or clench under the inturned flanges at the edge of the rim.

The object of the invention is to make the interior of the tire of such material and of such construction as will produce a tire of equal resilience to a pneumatic or a solid rubber tire, and which a puncture will not injure or affect as in a pneumatic tire, and which will be less expensive than a solid rubber tire, and have wearing qualities superior to either.

The object further is to do away with the inner tube in a clencher tire and to substitute a band drawn tight around the inside surface of the casing next to the rim, forming a wedge which forces the shoulders at the base of the tire out into the grooves formed for them in the rim, and thereby also making an air and water-tight tube or casing. Into this tube is forced, in a liquid state, a compound which hardens in a short time and forms an elastic core which is very resilient, making a practically solid tire.

The invention is illustrated in the accompanying drawings, in which

Figure 1:
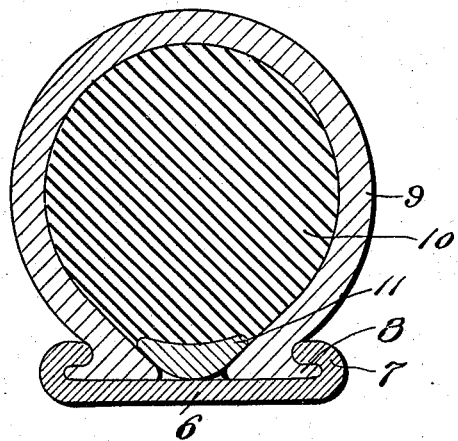
Figure 2:
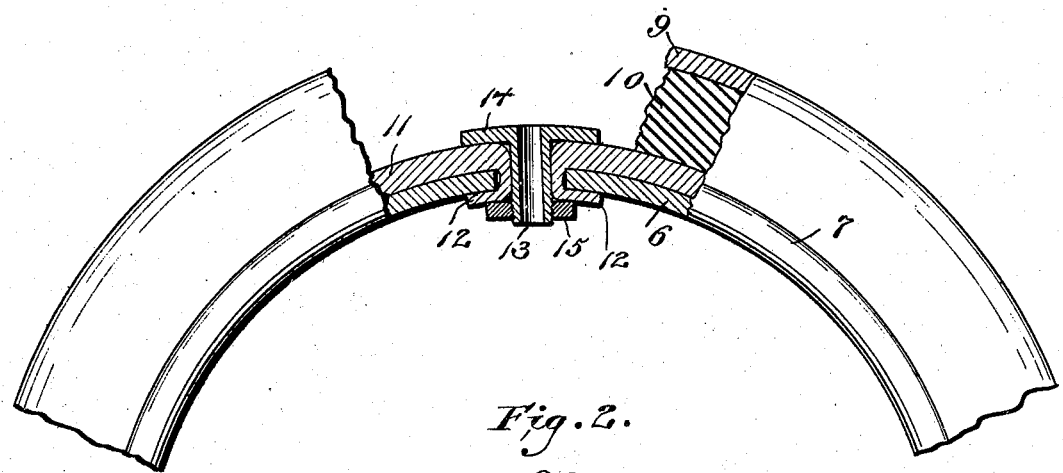
Figure 3:
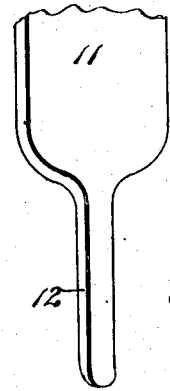

Figure 1 is a section of the tire. Fig. 2 is a plan thereof, parts being broken away to show how the fastening band is attached and clamped. Fig. 3 is a perspective view of one end of the band.

In the drawings, 6 indicates the rim turned in at the edges as at 7 to form grooves or hooks to receive the shoulders 8 at the base of the cover 9 which is divided lengthwise on the inside as usual in pneumatic tires of a known type. The elastic compound or filling is indicated at 10 and the fastening band at 11. The latter is substantially wedge shaped in cross section, or at least is thicker along the middle than along the edges. The ends of the band are reduced as at 12 so that said ends can be drawn through a hole in the rim.

A clamp for the ends of the band consists of a hollow bolt 13, having a broad flat head 14 and threaded on its inner end to receive a nut 15. The bolt is made hollow so that the liquid filling can be injected through the same into the casing after the latter is put on the rim.

The liquid filling may be any of the known compounds suitable for the purpose, but preferably is a special compound of the following ingredients in substantially the proportions stated: gelatine, ten and a half parts; glucose, twenty parts; rubber, one part; turpentine, one-sixth of a part; glycerin, one part; acetic acid, one-third of a part. These ingredients are mixed together forming a liquid compound which has a quality of setting or hardening into a semi-solid elastic state, forming an artificial rubber of good quality.

In assembling the tire, the cover 9 is first placed on the rim with the band 11 therein, the ends of the band extending through the hole in the rim, and bolt 13 being in place in said hole with the head inside. The band 11 is then pulled tight, by means of the projecting ends 12, and its wedge action has the effect of spreading the base of the tire and causing the shoulders thereof to engage in the hooks of the rim. While the band is held, the nut 15 is screwed on the bolt, thereby clamping the band in tight position. Then the liquid filling is injected through the bolt and allowed to set, forming a puncture-proof and resilient tire having the qualities and advantages heretofore referred to.

I claim:

1. A tire comprising a flanged rim having a hole therein, a casing on the rim having a split base with shoulders at the sides engageable with the flanges, a flexible band extending lengthwise around within the casing upon the base thereof and having flexible ends extending through the hole, means to fasten said ends, and a resilient filler within the casing.

2. A tire comprising a flanged rim having a hole therein, a casing on the rim having a split base engageable with the flanges to hold the casing on the rim, a band extending lengthwise around within the casing upon the base thereof and adapted to expand the same to engagement with the flanges, the band having flexible reduced ends extending through the hole, means to fasten the ends, and a resilient filler within the casing.

3. A tire comprising a rim, a casing secured thereon, and a filler within the casing consisting of a compound of gelatin, glucose, rubber, turpentine, glycerin and acetic acid.

In testimony whereof I have signed my name to this specification in the presence of two subscribing witnesses.

ALBERT D. RAY.

Witnesses:
JOHN A. BOMMHARDT,
SHIRLEY J. BOMMHARDT.